US011898364B2

(12) United States Patent
Fackler

(10) Patent No.: US 11,898,364 B2
(45) Date of Patent: Feb. 13, 2024

(54) EXTENDIBLE AND RETRACTABLE LIGHTING TOWER SYSTEM

(71) Applicant: BT FABRICATION, LLC, Salem, NJ (US)

(72) Inventor: Brandon Fackler, Salem, NJ (US)

(73) Assignee: BT FABRICATION, LLC, Salem, NJ (US)

( * ) Notice: Subject to any disclaimer, the term of this patent is extended or adjusted under 35 U.S.C. 154(b) by 65 days.

(21) Appl. No.: 17/733,071

(22) Filed: Apr. 29, 2022

(65) Prior Publication Data
US 2022/0349205 A1 Nov. 3, 2022

Related U.S. Application Data

(60) Provisional application No. 63/181,713, filed on Apr. 29, 2021.

(51) Int. Cl.
*E04H 12/18* (2006.01)
*B60Q 1/26* (2006.01)
*B60Q 1/30* (2006.01)
*F21V 21/30* (2006.01)
*B60P 3/18* (2006.01)

(52) U.S. Cl.
CPC .............. *E04H 12/182* (2013.01); *B60P 3/18* (2013.01); *B60Q 1/2657* (2013.01); *B60Q 1/307* (2013.01); *F21V 21/30* (2013.01)

(58) Field of Classification Search
CPC .......................... E04H 12/182; B60Q 1/2657
USPC ............ 52/118, 110, 79.5; 362/485; 343/713
See application file for complete search history.

(56) References Cited

U.S. PATENT DOCUMENTS

| 3,495,364 | A | * | 2/1970 | De Bella | B60P 3/18 52/118 |
| 4,220,981 | A | * | 9/1980 | Koether | B60P 3/18 362/543 |
| 4,363,084 | A | * | 12/1982 | Dimiceli | F21V 21/14 362/249.11 |
| 4,815,757 | A | * | 3/1989 | Hamilton | B60S 9/06 348/148 |
| 4,932,176 | A | * | 6/1990 | Roberts | H01Q 1/1235 52/118 |
| 5,115,606 | A | * | 5/1992 | Renegar | F21V 21/22 52/118 |
| 5,207,747 | A | * | 5/1993 | Gordin | F21V 23/02 362/264 |

(Continued)

*Primary Examiner* — Brent W Herring
(74) *Attorney, Agent, or Firm* — Volpe Koenig

(57) ABSTRACT

A lighting tower system is provided. The lighting tower system includes a tower positioned in an upright orientation within a bed of a vehicle. The tower includes a base tube section and an upper tube section. The base and upper tube sections include a common longitudinal axis and are arranged to slide relative to one another in a telescoping relationship to move each tower between a retracted position and a fully extended position. The lighting tower system includes a light assembly coupled to and extending from the upper tube section of the tower. The light assembly is configured to rotate with respect to the common longitudinal axis and to tilt with respect to an axis perpendicular to the common longitudinal axis. The lighting tower system includes a mounting configuration configured to attach and detach the tower to the bed of the vehicle in the upright orientation.

8 Claims, 8 Drawing Sheets

(56) References Cited

U.S. PATENT DOCUMENTS

| | | | | |
|---|---|---|---|---|
| 5,272,609 A * | 12/1993 | Nelson | F21S 9/022 | 362/427 |
| 5,524,398 A * | 6/1996 | Miller | B60P 3/18 | 52/114 |
| 5,572,837 A * | 11/1996 | Featherstone | B60Q 1/2657 | 52/118 |
| 5,611,177 A * | 3/1997 | Herbstritt | B60P 3/18 | 212/293 |
| 5,718,087 A * | 2/1998 | Featherstone | E04H 12/182 | 52/118 |
| 5,743,635 A * | 4/1998 | Hulse | E04H 12/182 | 362/385 |
| RE37,559 E * | 2/2002 | Marue | F16M 11/28 | 52/118 |
| 6,517,225 B1 * | 2/2003 | Allen | F21V 21/14 | 362/403 |
| 7,788,858 B1 * | 9/2010 | Ammons | B66C 23/44 | 212/292 |
| 7,989,979 B2 * | 8/2011 | Burgess | B60Q 1/245 | 307/112 |
| 8,733,963 B2 * | 5/2014 | Sharpley | F21V 21/26 | 362/183 |
| 9,159,254 B2 * | 10/2015 | Oyoung | G09F 17/00 | |
| 2013/0208494 A1 * | 8/2013 | Jones | B60Q 1/2611 | 362/523 |
| 2016/0281938 A1 * | 9/2016 | Carpoff | F21L 14/04 | |
| 2017/0023191 A1 * | 1/2017 | Magnotta | H02J 7/34 | |
| 2017/0254106 A1 * | 9/2017 | Bruinsma | F21V 21/22 | |
| 2018/0320835 A1 * | 11/2018 | Poage | F21S 9/032 | |

\* cited by examiner

EXTENDIBLE AND RETRACTABLE LIGHTING TOWER SYSTEM

CROSS REFERENCE TO RELATED APPLICATIONS

This application claims priority from U.S. Provisional Patent Application No. 63/181,713, entitled "EXTENDIBLE AND RETRACTABLE LIGHTING TOWER SYSTEM," filed on Apr. 29, 2021, which is hereby incorporated by reference as if set forth in full in this application for all purposes.

BACKGROUND

Mobile temporary lighting is used at locations where lighting is limited and additional lighting is needed. Temporary lighting for short periods of time may be required, and may need to be erected or removed quickly. For example, temporary lighting may be necessary for night shifts at work sites and in emergency situations, where lighting may be insufficient. Such work sites may include roadways and highways. Often bulky trailers or skids are used to move and support temporary lighting. Often, contractors performing such work must make advance arrangements with third-party providers to provide such lighting at the work site, which can be costly, and can introduce costly delays. What is needed is a new lighting tower system for improved lighting.

SUMMARY

According to one or more embodiments, a lighting tower system is provided. The lighting tower system includes at least one tower positioned in an upright orientation within a bed of a vehicle. Each tower of the at least one tower includes at least a base tube section and an upper tube section. The base and upper tube sections include a common longitudinal axis and are arranged to slide relative to one another in a telescoping relationship to move each tower between a retracted position and a fully extended position. The lighting tower system includes a light assembly coupled to and extending from the upper tube section of each tower of the at least one tower. The light assembly is configured to rotate with respect to the common longitudinal axis and to tilt with respect to an axis perpendicular to the common longitudinal axis. The lighting tower system includes a mounting configuration configured to attach and detach the at least one tower to the bed of the vehicle in the upright orientation.

Additional features and advantages are realized through the techniques of the present disclosure. Other embodiments and aspects of the disclosure are described in detail herein. For a better understanding of the disclosure with the advantages and the features, refer to the description and to the drawings.

DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

According to one or more embodiments, a lighting tower system is provided. The lighting tower system can include one or more towers. Each tower can be positioned in an upright orientation within a bed of a vehicle. Each tower moves between a retracted position and a fully extended position. When the one or more towers includes at least two towers, the at least two towers can be substantially parallel. One or more light assemblies extend from each tower. A height of each tower and a position of each lighting assembly is independently adjustable. The lighting tower system, when in the retracted position, positions each tower (and corresponding lighting assemblies) sufficiently low with respect to the vehicle to avoid clearance problems when driving the vehicle on roadways to and from a destination, such as a work site, a roadside, or a construction site where lighting may be insufficient. The lighting tower system provides improved lighting at the destination.

Figure 1:
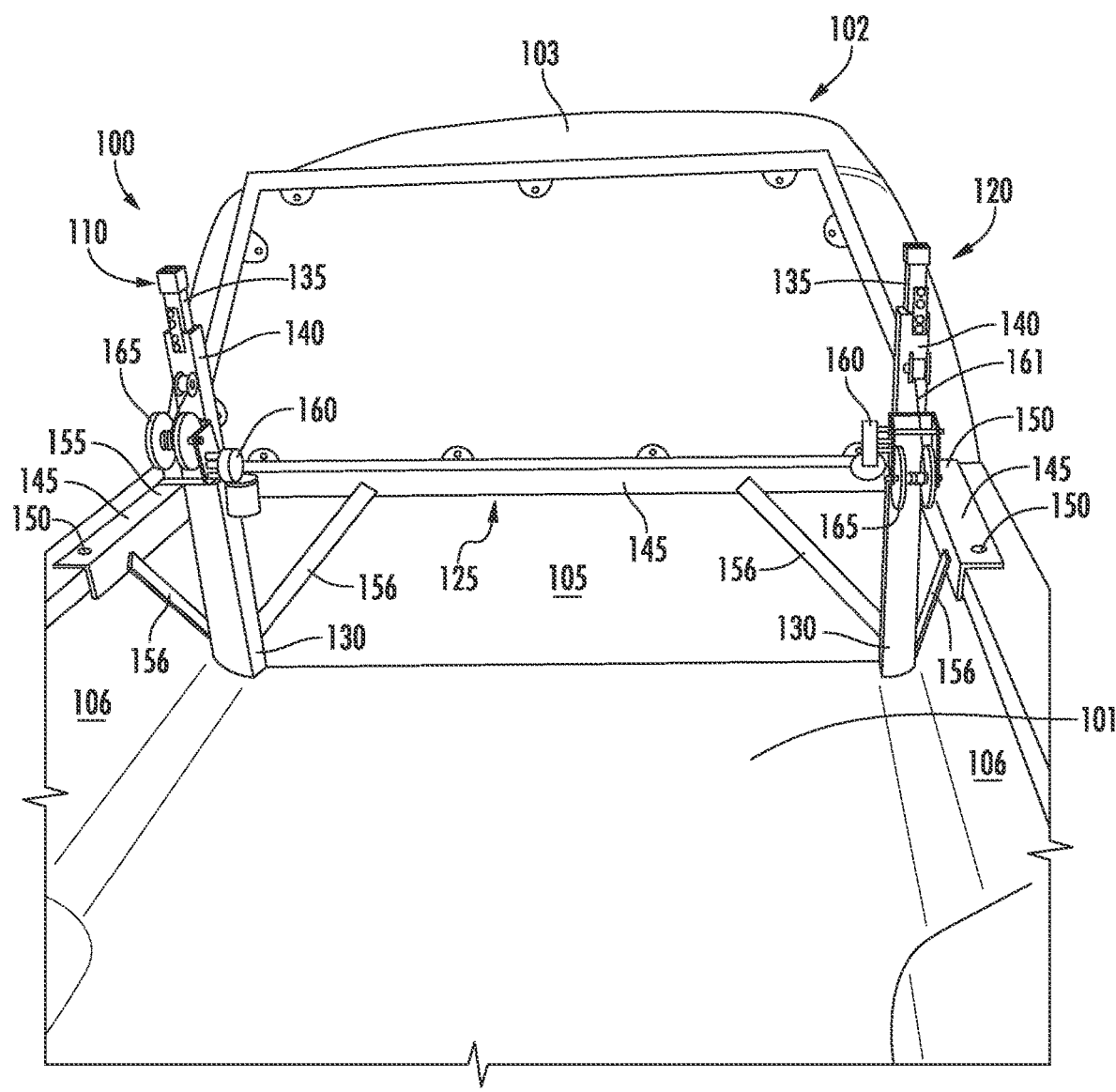
FIG. 1 is a perspective view of a lighting tower system mounted within a bed of a vehicle with light assemblies disconnected therefrom according to one or more embodiments.

FIG. 1 is a perspective view of a lighting tower system 100 according to one or more embodiments. The lighting tower system 100 is shown in a bed 101 of a vehicle 102, which in this example is a pickup truck. The vehicle 102 may include a cab 103. The bed 101 of the vehicle 102 may include a front wall 105 and side walls 106. The lighting tower system 100 is mounted within the bed 101 of the vehicle 102 with light assemblies disconnected therefrom. The lighting tower system 100 disposed in the retracted position to avoid clearance problems when driving the vehicle 102 on roadways to a destination.

Using the vehicle 102, the lighting tower system 100 can be easily moved to provide temporary mobile lighting to vehicle-accessible locations to provide a safer and more secure worksite or emergency scene. For example, the lighting tower system 100 may be used in utility construction, road construction, oil and gas construction and maintenance, emergency response, farming, outdoor public events and towing and recovery services. Since the lighting tower system 100 is mounted in the bed 101 of the vehicle 102, the lighting tower system 100 can be brought to difficult-to-access locations. Also, the lighting tower system 100 can be setup (i.e., raised or lowered) upon arrival.

The lighting tower system 100 includes one or more towers 110 and 120. The towers 110 and 120 can be positioned in an upright orientation within the bed 101 of the vehicle 102, as well as a substantially parallel orientation. Each tower 110 and 120 may, for example, be mounted in the bed 101 of the vehicle 102 in proximity to the cab 103 while still allowing space in the bed 101 for other purposes.

The lighting tower system 100 can be installed in a vehicle 102 without major modifications to the vehicle's electrical systems or mechanical structure. The lighting tower system 100 may be easily mounted and secured to the vehicle 102 by a variety of fastener methods, including bolts, cables, and/or rods attached to the bed 101. For example, lighting tower system 100 can include a mounting configuration configured, such as a frame assembly 125, to attach and detach the towers 110 and 120 to the bed 101 in the upright orientation. The mounting configuration holds the lighting tower system 100 in the upright orientation within the bed 101.

Each tower 110 and 120 includes adjacent telescoping sections, such as a base tube section 130. According to one or more embodiments, each tower 110 and 120 can include an upper tube section 135 (also shown in FIGS. 5, 6, and 7). According to one or more embodiments, each tower 110 and 120 can include a middle tube section 140 (also shown in FIGS. 5, 6, and 7). Although at least three telescoping tube sections are illustrated for example purposes, there may alternative configurations, i.e., two tube sections, or greater than two telescoping tube sections. The telescoping sections 130, 135, and 140 may be tubular, which may be for example square, circular, or any other simple convex polygonal shape, in cross-section. The telescoping sections 130, 135, and 140 may for example be made of metal, composite, metal alloy, plastic, etc.

The base tube section 130, the middle tube section 140, and the upper tube section 135 can a common longitudinal axis and are arranged to slide relative to one another in a telescoping relationship to independently move each tower 110 and 120 between the retracted position, the fully extended position, and desired intermediate positions (e.g., the base tube section 130 can be stationary and fixed to the bed 101, while the upper tube section 135 and/or the middle tube section 140 slides with respect to the base tube section 130). According to one or more embodiments, each tower 110 and 120 may be positioned the retracted position, which is sufficiently low to avoid clearance problems when driving the vehicle 102 with the lighting tower system 100 mounted thereto on roadways to the destination. Once the destination has been reached, the towers 110 and 120 may be deployed to the fully extended position or to any desired intermediate position between the retracted and fully extended position to provide lighting may be insufficient, such as during road repair at night. Note that the vehicle 102 can move while the lighting tower system 100 is not in the retracted position.

According to one or more embodiments, the frame assembly 125 is configured to be fixed to the bed 101, such that the base tube section 130 is stationary and mounted to the frame assembly 125 by utilizing a variety of standard methods, including bolting. By way of example, the system 100 is mounted and secured to the bed 101 utilizing the frame assembly 125 that includes horizontal frame members 145 extending across the front wall 105 and extending from the front wall 105 along the side wall 106 towards the rear of the bed 101. The frame members 145 may be formed of any suitable material, e.g., angle-iron, and may be secured to each other and to the walls 105 and 106 of the bed 101 utilizing suitable hardware or fasteners, e.g., bolts 150. The frame members 145 can meet to form corners 155. Vertical support members may extend downwardly from the corners 155 to a horizontal floor of the bed 101. Likewise, additional diagonal support members 156 may be provided to join the frame members 145 to the vertical support members to add overall rigidity to the frame assembly 125. For example, the towers 110 and 120 may be mounted and secured to the frame assembly 125 in the vicinity of the corners 155 by any suitable method, utilizing any suitable hardware, e.g., nuts and bolts.

Figure 2:
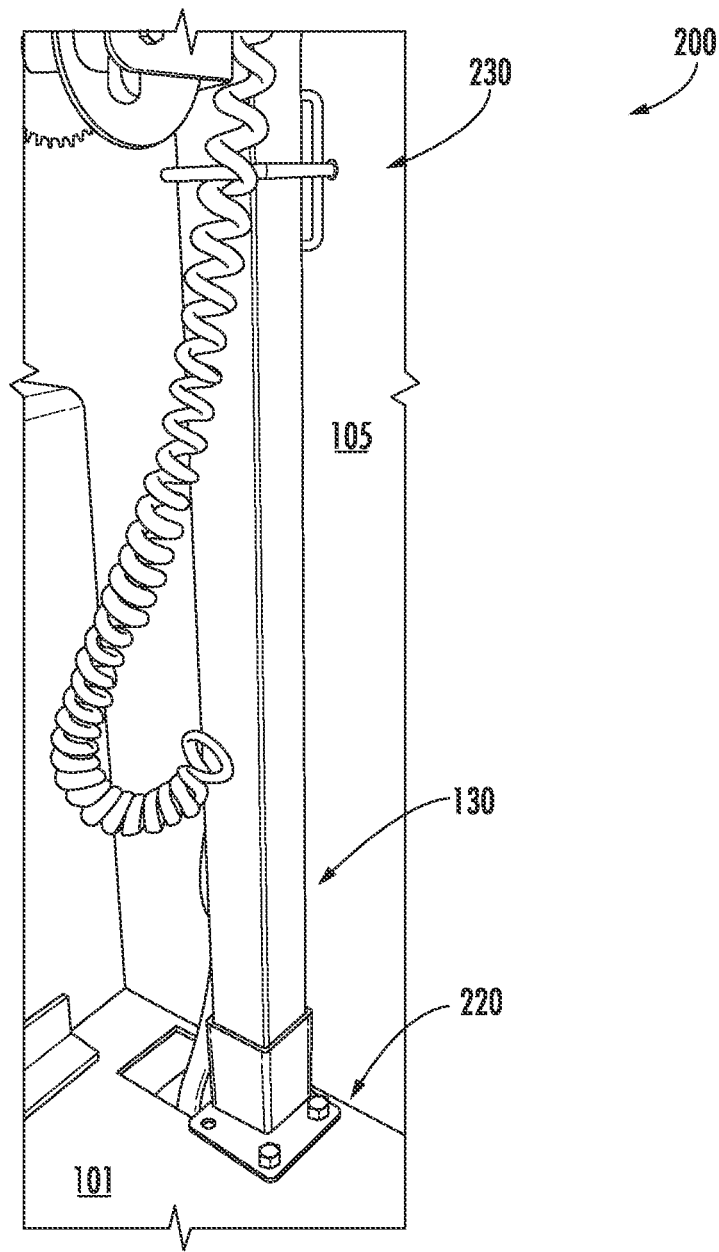
FIG. 2 is a perspective view of a mounting configuration according to one or more embodiments.

Turning to FIG. 2, a perspective view of a mounting configuration 200 is provided according to one or more embodiments. The mounting configuration 200 includes a tubing footer 220 configured to be fixed to the bed 101, by one or more fasteners. In an example, the tubing footer 220 includes at least one prefabricated hole for receiving a fastener. As shown in FIG. 2, the tubing footer 220 includes at least three prefabricated holes, two of which are receiving two bolts. The tubing footer 220 also is configured to receive a lower portion of the base tube section 130. The tubing footer 220 can include a shape that matches an outer shape of the base tube section 130 to provide a tight or snug fit. The mounting configuration 200 includes an fastener 230, such as U-bolt, that is configured to be fixed to the vehicle 101 (i.e., a front wall 105) and to hold an upper portion of the base section 130 to the bed 101. Note, as shown in FIG. 2, wiring for the lighting tower system 100 can be configured to pass through the bed 101.

Returning to FIG. 1, the lighting tower system 100 may include one or more winches 160, each dedicated to one of the towers 110 and 120. Each winch 660 may include a cylindrical drum 165 configured to be rotatable about a horizontal or vertical axis in forward and reverse directions in response to forward and reverse actuation of the winch 660. Each winch 160 includes a retractable winch cable 161 (shown as cable 610 in FIG. 5) for connection to its corresponding towers 110 and 120. The drum 165 is, thus, arranged for spooling the retractable winch cable 161. In this manner, each tower 110 and 120 may be independently raised and lowered and positioned at desired intermediate positions therebetween to cast light from more than one vertical height and/or in more than one direction simultaneously. Once work has been performed, the towers 110 and 120 may be moved to the retracted position to provide sufficient clearance to resume driving the vehicle on roadways when returning from the job site.

Figure 3:
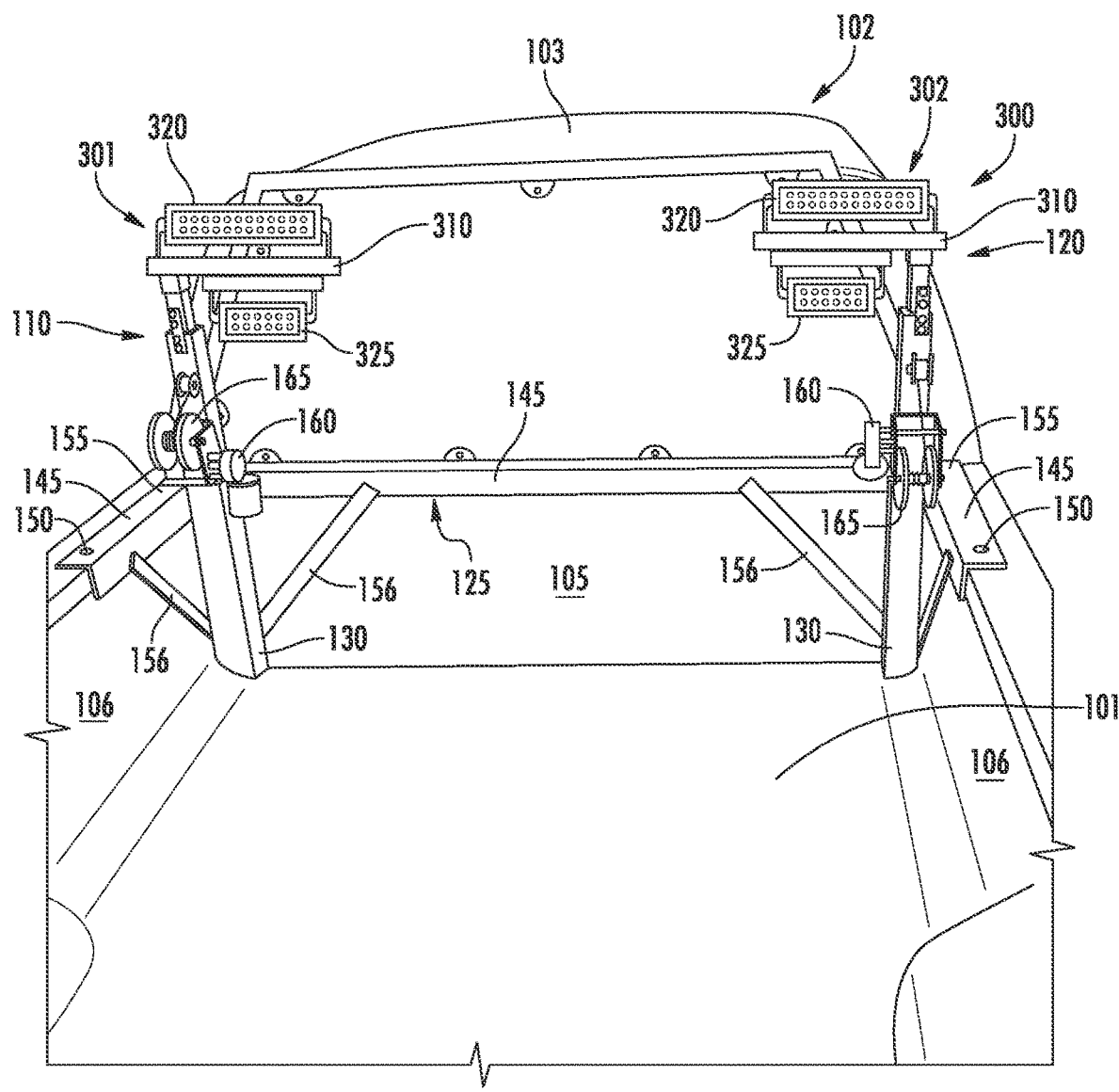
FIG. 3 is a perspective view of a lighting tower system mounted within a bed of a vehicle with light assemblies connected thereto according to one or more embodiments.

Turning to FIG. 3, a perspective view of a lighting tower system 300 is provided according to one or more embodiments. The lighting tower system 300 disposed in the retracted position to avoid clearance problems when driving the vehicle 102 on roadways to a destination. The lighting tower system 300 is mounted within the bed 101 of the vehicle 102 with light assemblies 301 and 302 connected thereto. For example, each tower 110 and 120 may include the lighting assembly 301 and 302 mounted to and extending upwardly from the upper tube section 135 or the middle tube section 140 thereof.

For example, each lighting assembly 301 and 302 may include a lighting framework 310 to which light bars 320 and 325 are affixed. The light bars 320 and 325 may be low voltage light emitting diodes (LED) lights, which may result in lower maintenance and emissions. LED lights also provide light immediately on being powered, and do not require warm up or cool down time. The LED lights do not produce noise pollution. The light bars 320 and 325 may be flood or area light fixtures.

The lighting framework 310 may be formed of any suitable material, e.g., angle-iron components, and may be affixed to the upper tube section 135 or the middle tube section 140 by any suitable means. The lighting framework 310 may include a vertical component or downwardly extending arm arranged to fit within an open top end of the upper tube section 135 or the middle tube section 140 and be affixed therein utilizing any suitable fastening hardware. The lighting framework 310 may be rotatably mounted to the upper tube section 135 or the middle tube section 140 to enable independent rotational positioning of the light bars 320 and 325 mounted thereto.

Figure 4:
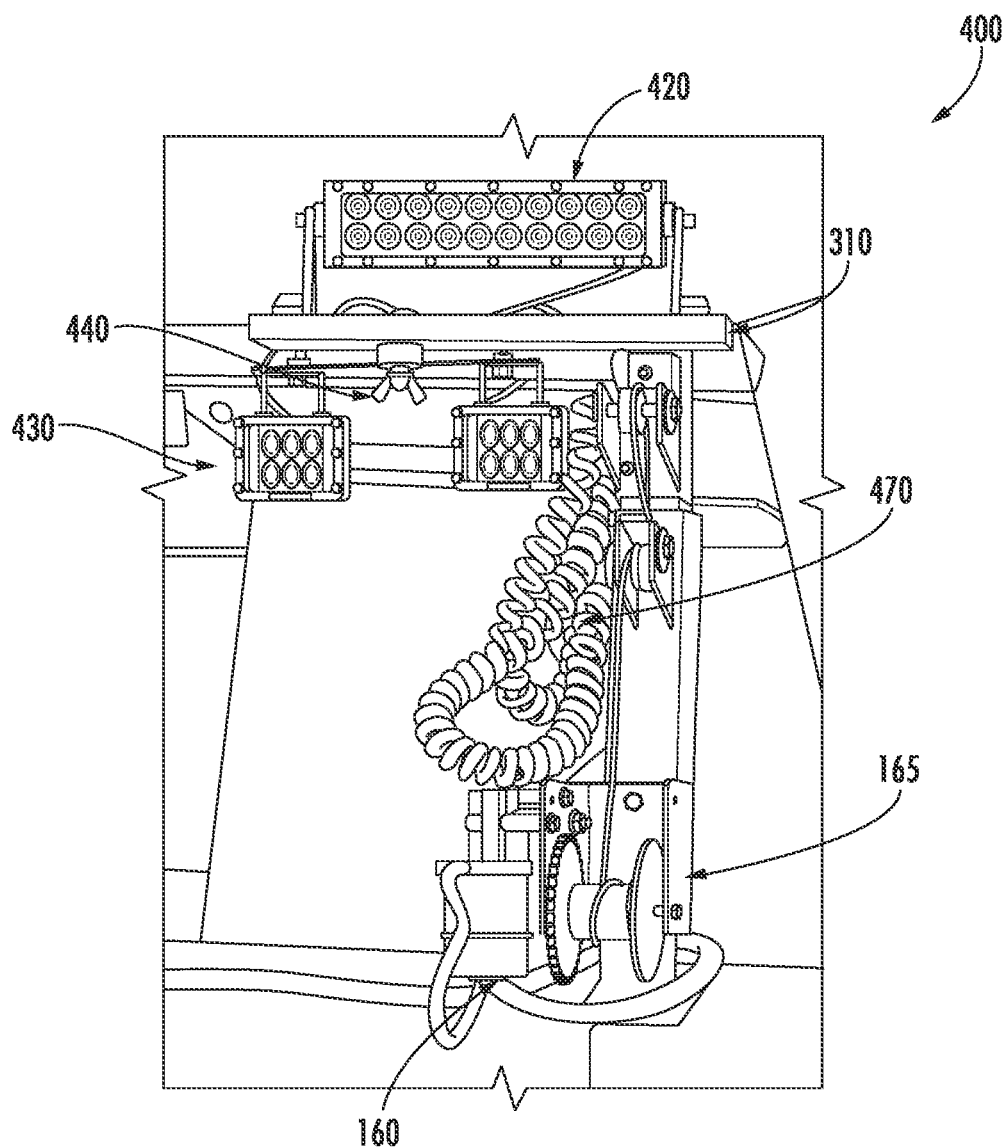
FIG. 4 is a perspective view of a light assembly according to one or more embodiments.

Turning to FIG. 4, a perspective view of a light assembly 400 is provided according to one or more embodiments. The light assembly 400 can include one or more light bars 420 and one or more light bars 430, each of which are attached in one or more movable ways for adjusting the position thereof. By way of example, the one or more light bars 430 can be attached to the lighting framework 310 by a wing nut 440, such that the one or more light bars 430 can rotate with respect to the lighting framework 310. Further, the one or more light bars 430 can be attached by a hinge or the like to enable a tilt with respect to the lighting framework 310. The light assembly 400 can include one or more power cables 470 that connect each of the one or more light bars 420 and 430 to a power source and/or toggle switch as described herein.

The lighting framework 310 may be any suitable dimensions to accommodate mounting different types of lighting elements thereto. For example, the lighting framework 310 may be of a suitable length, e.g., 12 inches, and formed of any suitable material, e.g., square tubing measuring 1"×2" in cross-section, and ⅛" in thickness. However, it should be understood that the lighting framework 310 may take on different shapes and sizes based upon the light sources to be mounted thereto. For example, as shown in FIG. 3, the light sources may include a horizontally-oriented 12-inch light bar 320 mounted above the lighting framework 310, and a horizontally-oriented 7-inch light bar 325 mounted beneath the lighting structure 130. It should be understood that each lighting framework 310 may have any of a variety of sizes and styles of lighting elements mounted thereto. The lighting framework 310 may rotate on an axis parallel to the ground to allow the lighting elements 320 and 325 to be directed towards the ground at a variety of angles. The light bars 320 and 325 may be hinge-mounted to the lighting framework 310 to enable vertical adjustability of the light bars 320 and 325 independently of one another. In addition, the light bars 320 and 325 of the tower 110 may be vertically adjusted independently of the light bars 320 and 325 of the tower 120.

Figure 5:
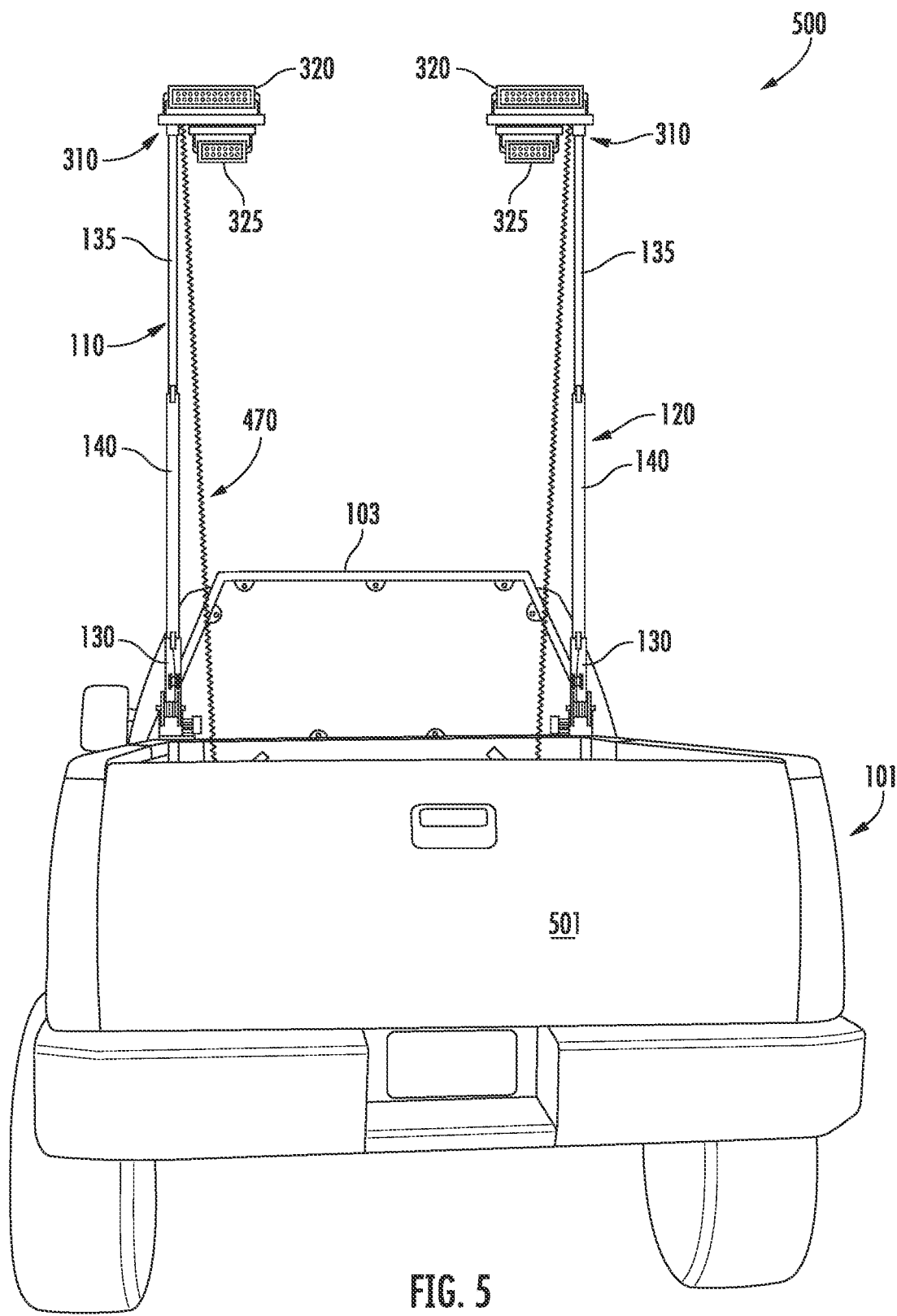
FIG. 5 is a perspective view of a lighting tower system mounted within the bed of a vehicle with telescoping sections disposed in a fully extended position according to one or more embodiments.

FIG. 5 is a perspective view of a lighting tower system 500 according to one or more embodiments. The lighting tower system 500 is mounted within the bed 101 of the vehicle 102 with light assemblies 301 and 302 connected thereto and with a hinged gate 501 opposite the front wall 105. The lighting tower system 500 disposed in the fully extended position. Generally, when in the fully extended position, the vehicle 102 and the lighting tower system 500 are at a destination (e.g., at locations where lighting may be insufficient, such as during road repair at night).

Figure 6:
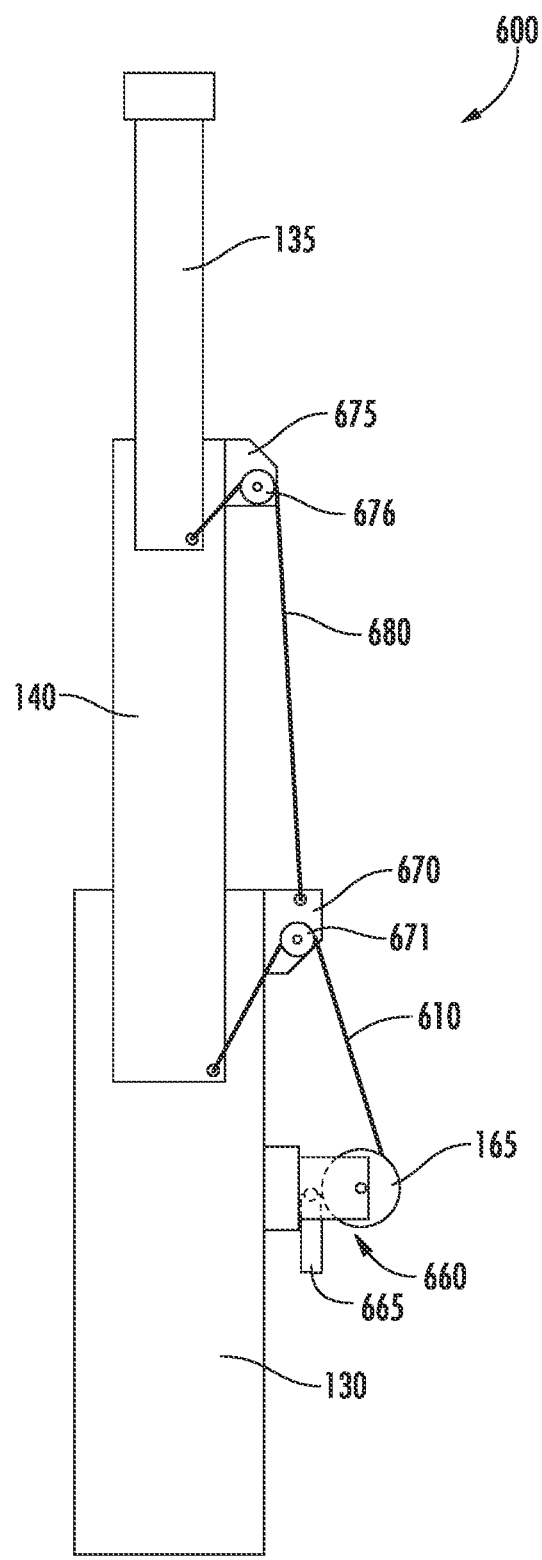
FIG. 6 is a view of a telescoping section according to one or more embodiments.

FIG. 6 is a view of a telescoping section 600 according to one or more embodiments. The telescoping section 600 of FIG. 6 demonstrates a manner in which each tower may be independently raised and lowered utilizing a motor-driven winch 660.

The adjacent telescoping sections 130, 140, 135 may be controlled by an electrically powered mechanism, which may for example be a motor-driven winch 660. For example, as shown in FIG. 6, the motor driven winch 660 may be affixed to the base tube section 130 about midway up its height. The motor-driven winch 660 may include a motor 665 and the drum 165 coupled to the motor 665. The drum 165 is configured to be rotatable about a horizontal or vertical axis in forward and reverse directions in response to forward and reverse actuation of the motor 665. The cable 610 (i.e., the retractable winch cable 161 of FIG. 1) is wound over the drum 165 to form a coil and may be 'payed out' from the drum 165 or 'reeled in' over the drum 165 based upon the direction of rotation of the drum 165 as dictated by actuation of the motor 665. The cable 610 can be of any suitable material, such as metal, plastic, fiber, etc.

A first block 670 including a spool or rotatable pulley 671 mounted thereto is affixed to the base tube section 130 at a position at or near the top thereof. The cable 610 extends over the spool or rotatable pulley 671 and attaches at its free end at or near the bottom portion of the middle tube section 140. A second block 675 including a second spool or rotatable pulley 676 mounted thereon is affixed to the middle tube section 140 at a position at or near the top portion of the middle tube section 140. A cable 680, which can be similar to the cable 610, is provided. The first end of the second cable 680 is affixed to the first block 670, and the cable 680 extends from the first block 670 over the second spool or rotatable pulley 676 and is attached at its second end at or near the bottom portion of the upper tube section 135. The motor-driven winch 660 may include an electronic limit switch to prevent the telescoping sections 130, 135, and 140 from extending further than desired. According to one or more embodiments, the cable 610 and/or the second cable 680 may be made of metal, such as for example steel.

According to one or more embodiments, actuating the motor 665 to reel the cable 610 onto the drum 165 will pull the cable 610 taut thereby lifting the middle tube section 140. Further, reeling the cable 610 onto the drum 165 will cause a pull on the cable 680 thereby simultaneously lifting the upper tube section 135 and raising the telescoping sections 130, 135, and 140 towards the fully extended position. Likewise, a slackening or paying out of the cable 610 off the drum 165 will cause the upper tube section 135 and the middle tube section 140 to move from elevated positions at or near the fully extended position to the retracted position. The motor-driven winch 660 may automatically stop the extension when the telescoping sections 130, 135, and 140 reach their fully extended position. A spring actuated mechanical lock may engage when full extension is reached.

Figure 7:
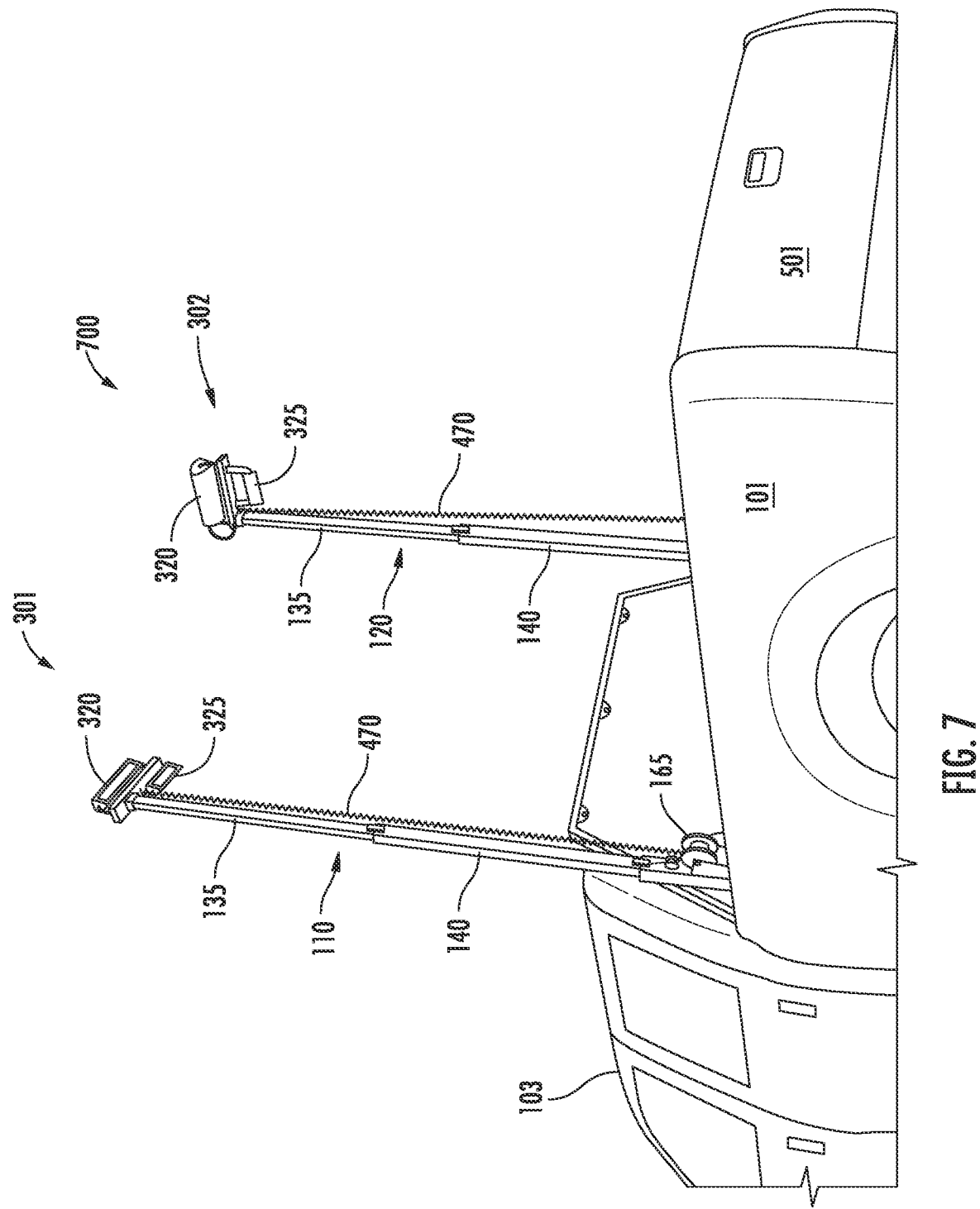
FIG. 7 is a perspective view of a lighting tower system according to one or more embodiments.

FIG. 7 is a perspective view of a lighting tower system 700 according to one or more embodiments; The lighting tower system 700 of FIG. 7 illustrating a manner for independently rotating the light assemblies 301 and 302 to desired positions. For example, in this manner, the light assembly 301 of the tower 110 may be positioned in a first position to face towards a rear of the vehicle 102 to illuminate an area located behind the vehicle 102, while the light assembly 302 of the tower 120 may be positioned in a second position to face a side of the vehicle 102 to illuminate an area adjacent the side of the vehicle 102. The first position may be perpendicular to the second position. The light assemblies 301 and 302 of the respective towers may be positioned independently of each other in a variety of ways to illuminate different areas in different locations.

Figure 8:
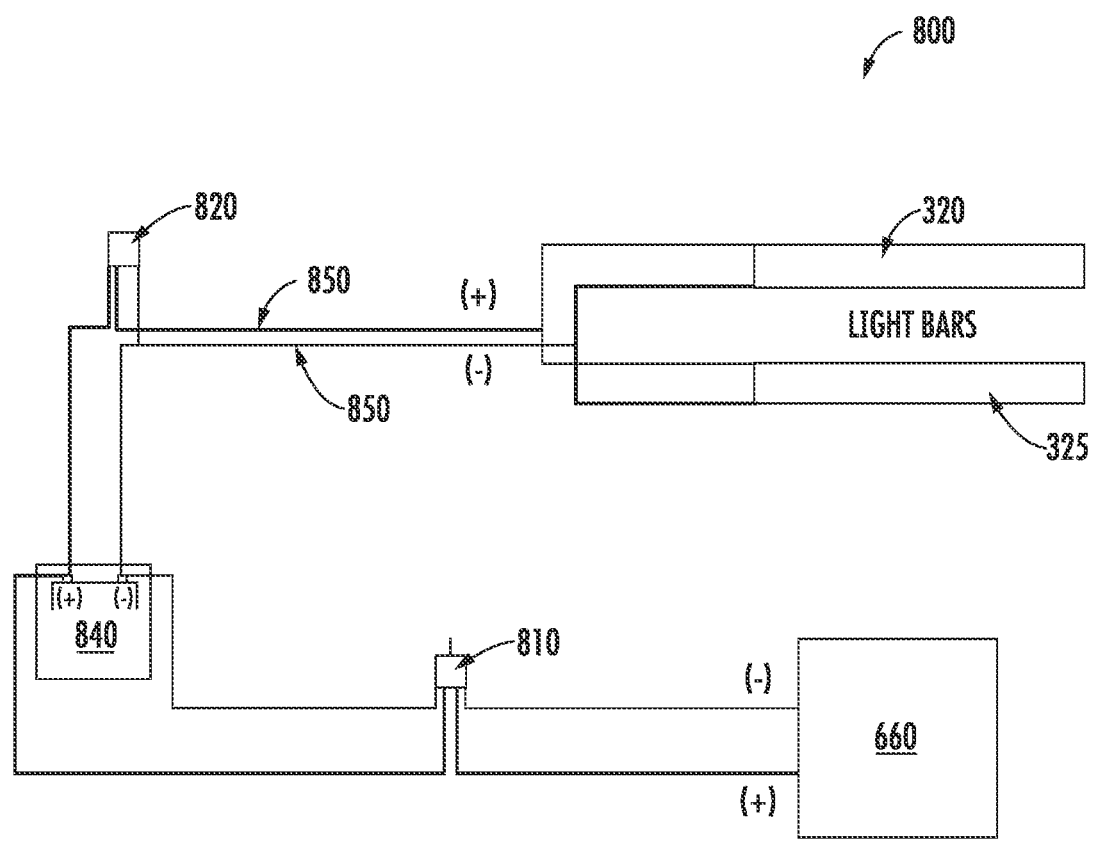
FIG. 8 is a schematic diagram of electrical system according to one or more embodiments.

FIG. 8 is a schematic diagram of electrical system 800 according to one or more embodiments. The electrical system 800 demonstrates a manner in which any of the lighting tower system embodiment herein can be connected or wired. The lighting tower system 800 can include one or more switches (e.g., a toggle switch 810 and a toggle switch 820), which can be located anywhere on the lighting tower system 100 and/or the vehicle 102. The toggle switch 810 is electrically and communicatively coupled to the motor-driven winch 660 and, when actuated, causes the motor-driven winch 660 to retract or release a retractable winch cable. The toggle switch 820 is electrically and communicatively coupled to the light assemblies 301 and 302 and, when actuated, causes the light assemblies 301 and 302 to turn on.

The electrical system 800 can be powered by any standard power supply. For example, the lighting elements 320 and 325 of both towers 110 and 120 may be powered by a vehicle battery 840. According to one or more embodiments, the toggle switch 820 may be positioned between the battery 840 and light bars 320 and 325 of each tower 110 and 120 to enable independent operation of the light bars on these respective towers. Wires 850 extend from the toggle switch 820 to each of the light bars 320 and 325 and other components of the electrical system 800. The battery 840 may be charged by the vehicle 102 when running. The toggle switch 810 may be positioned between the battery 866 and the motor-driven winch 660 to control movement of the towers 110 and 120 between the retracted and fully extended positions. An automatic charge relay can form part of the electrical system 800 for the towers 110 and 120, may be used to ensure that a starting battery of the vehicle 102 is never overdrawn, to avoid potentially leaving the vehicle 102 inoperable. Charging may occur any time the vehicle 102 is running therefore storing any unused electrical energy created by the vehicle 102.

According to one or more embodiments, a lighting tower system is provided. The lighting tower system includes at least one tower positioned in an upright orientation within a bed of a vehicle. Each tower of the at least one tower includes at least a base tube section and an upper tube section. The base and upper tube sections include a common longitudinal axis and are arranged to slide relative to one another in a telescoping relationship to move each tower between a retracted position and a fully extended position. The lighting tower system includes a light assembly coupled to and extending from the upper tube section of each tower of the at least one tower. The light assembly is configured to rotate with respect to the common longitudinal axis and to tilt with respect to an axis perpendicular to the common longitudinal axis. The lighting tower system includes a mounting configuration configured to attach and detach the at least one tower to the bed of the vehicle in the upright orientation.

According to one or more embodiments or any of the lighting tower system embodiments herein, the mounting configuration can include at least a tubing footer configured to be fixed to the bed and to receive a lower portion of the base tube section and a fastener configured to be fixed to the vehicle and to hold an upper portion of the base section to the vehicle.

According to one or more embodiments or any of the lighting tower system embodiments herein, the mounting configuration can include a frame assembly configured to be fixed to the bed and to the base and upper tube sections to hold the lighting tower system in the upright orientation within the bed.

According to one or more embodiments or any of the lighting tower system embodiments herein, the lighting tower system can include a motor-driven winch corresponding and dedicated to each tower. The motor-driven winch can include a retractable cable for connection to the tower and to cause independent movement of the tower between the retracted and fully extended positions.

According to one or more embodiments or any of the lighting tower system embodiments herein, the motor-driven winch can include a drum arranged for spooling the retractable cable thereon.

According to one or more embodiments or any of the lighting tower system embodiments herein, each tower of the at least one tower can include a pulley coupled to the base tube section. A retractable cable of a motor-driven which can be arranged to pass over the pulley and attach to a lower portion of the upper tube section to enable sliding movement of the base and upper tube sections relative to one another during operation of the motor-driven winch.

According to one or more embodiments or any of the lighting tower system embodiments herein, each tower of the at least one tower can include a middle tube section situated between the base tube section and the upper tube section. The middle tube section can be configured to slide relative to the base tube section and the upper tube section. The middle tube section can have a longitudinal axis aligned with the common longitudinal axis and can be arranged to slide relative to the base and upper tube sections to move the tower between the retracted and fully extended positions.

According to one or more embodiments or any of the lighting tower system embodiments herein, the base tube section can be stationary and fixed to the bed. The upper tube section can slide with respect to the base tube section.

According to one or more embodiments or any of the lighting tower system embodiments herein, the lighting assembly can include a 12-inch light bar and a 7-inch light bar.

According to one or more embodiments or any of the lighting tower system embodiments herein, the lighting tower system can include a first switch communicatively coupled to a motor-driven winch. When actuated, the first switch can cause the motor-driven winch to retract or release a retractable cable thereby lowering or raising the tower to the retracted position or to the fully extended position, respectively.

According to one or more embodiments, a lighting tower system is provided. The lighting tower system can include a pair of towers arranged to be positioned in an upright and substantially parallel orientation within the bed of a vehicle. Each tower of the pair can include at least a base tube section and an upper tube section. The base and upper tube sections can have a common longitudinal axis and can be arranged to slide relative to one another in a telescoping relationship to move each tower between a retracted position and an extended position. The lighting tower system can include a light assembly extending from the upper tube section of each of the pair of towers. Each light assembly can be arranged to rotate with respect to the common longitudinal axis to various desired positions and to tilt with respect to an axis perpendicular to the longitudinal axis to various desired positions. Each tower of the pair can be arranged to be moved between the retracted and extended positions independently of one another by way of a motor-driven winch dedicated to each of the pair of towers. Each motor-driven winch can include a retractable cable for connection to the tower.

According to one or more embodiments or any of the lighting tower system embodiments herein, the lighting tower system can include a first pulley coupled to the base tube section. The retractable cable can be arranged to pass over the first pulley and attach to a lower portion of the upper tube section to enable sliding movement of the lower and upper tube sections relative to one another during operation of the motor-driven winch.

According to one or more embodiments or any of the lighting tower system embodiments herein, each tower can be positioned at an adjacent corner of the bed.

According to one or more embodiments or any of the lighting tower system embodiments herein, the base tube section can include a substantially square cross section. The upper tube section can include a substantially square cross section that is less than the substantially square cross section of the base tube section.

According to one or more embodiments or any of the lighting tower system embodiments herein, the base tube section can include a substantially circular cross section. The upper tube section can include a substantially circular cross section that is less than the substantially circular cross section of the base tube section.

According to one or more embodiments or any of the lighting tower system embodiments herein, each motor-driven winch can include a drum arranged for spooling the retractable cable thereon.

According to one or more embodiments or any of the lighting tower system embodiments herein, the lighting tower system can include a middle tube section situated between the base tube section and the upper tube section. The middle tube section can be arranged to slide relative to the base tube section and the upper tube section. The middle tube section can have a longitudinal axis aligned with the common longitudinal axis and can be arranged to slide relative to the base and upper tube sections to move each lighting tower between the retracted position and extended positions.

According to one or more embodiments or any of the lighting tower system embodiments herein, the lighting tower system can include a frame assembly affixed to the bed of the vehicle. The base tube section of each tower can be arranged for mounting to the frame assembly.

According to one or more embodiments or any of the lighting tower system embodiments herein, each motor driven winch can be arranged for mounting to the lighting tower assembly.

According to one or more embodiments or any of the lighting tower system embodiments herein, the base tube section can be stationary, The upper tube section can slide with respect to the base tube section.

According to one or more embodiments or any of the lighting tower system embodiments herein, the lighting assembly can include a 12-inch light bar and a 7-inch light bar.

According to one or more embodiments or any of the lighting tower system embodiments herein, the lighting tower system can include a battery and a first switch. The first switch can be electrically/communicatively coupled to the battery. The battery can be electrically/communicatively coupled to the motor-driven winch of one of the towers. When the first switch is actuated, the winch of one of the towers can retract the retractable cable thereby raising the one of the towers from the retracted position to the extended position.

According to one or more embodiments or any of the lighting tower system embodiments herein, the lighting tower system can include a second switch. The second switch can electrically/communicative coupled to the battery. The battery can be electrically/communicatively coupled to the lighting assembly of one of the towers. When the second switch is actuated, the lighting assembly of the towers can illuminate.

According to one or more embodiments, a method of providing light to a predefined area is provided. The method can include providing a pair of towers. Each tower of the pair can include at least a base tube section and an upper tube section. The tube sections can have a common longitudinal axis and can be arranged to slide relative to one another in a telescoping relationship to move each tower between a retracted position and an extended position. Each tower of the pair can include a light assembly extending from the upper tube section of each tower. Each light assembly can be arranged to rotate with respect to the longitudinal axis to various desired positions and to tilt with respect to an axis perpendicular to the longitudinal axis to various desired positions. Each tower can be arranged to be moved between the retracted and extended positions independently of one another by way of a motor-driven winch dedicated to each tower. Each motor-driven winch can include a retractable cable for connection to each tower. The method can include positioning the pair of towers in an upright and substantially parallel orientation within the bed of a vehicle. The method can include providing a battery electrically/communicatively coupled to the motor-driven winches dedicated to each tower. The method can include providing a first switch electrically/communicatively coupled to the battery to actuate one of the motor-driven winches to selectively move one of the at least two towers between the retracted and extended positions. The method can include providing a second switch electrically/communicatively coupled to the battery to actuate one of the lighting assemblies of the at least two towers.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A lighting tower system comprising:
   at least one tower positioned in an upright orientation within a bed of a vehicle, each tower of the at least one tower comprising:
   a base tube section,
   a pulley coupled to an upper portion of the base tube section,
   a winch coupled to the base tube section and comprising a retractable cable, and
   an upper tube section and comprising a lower portion with the retractable cable fixed thereto, the base and upper tube sections comprising a common longitudinal axis and the retractable cable being configured to pass over the pulley to enable telescoping sliding movement of the upper tube section relative to the base tube section during operation of the winch to move each tower between a retracted position and a fully extended position;
   a light assembly coupled to and extending from the upper tube section of each tower of the at least one tower, the light assembly being configured to rotate with respect to the common longitudinal axis and to tilt with respect to an axis perpendicular to the common longitudinal axis; and
   a mounting configuration configured to attach and detach the at least one tower to the bed of the vehicle in the upright orientation, wherein the mounting configuration configured to receive the lower portion of the base tube section, and wherein the winch is coupled to the base tube section at a location along the common longitudinal axis and above the mounting configuration.

2. The lighting tower system of claim 1, wherein the mounting configuration comprises at least:
   a tubing footer configured to be fixed to the bed and to receive the lower portion of the base tube section; and
   a fastener configured to be fixed to the vehicle and to hold the upper portion of the base tube section to the vehicle.

3. The lighting tower system of claim 1, wherein the mounting configuration comprises a frame assembly configured to be fixed to the bed and to hold the lighting tower system in the upright orientation within the bed.

4. The lighting tower system of claim 1, wherein the winch comprises a motor-driven winch.

5. The lighting tower system of claim 1, wherein the winch comprises a drum arranged for spooling the retractable cable thereon.

6. The lighting tower system of claim 1, wherein the base tube section is stationary and fixed to the bed.

7. The lighting tower system of claim 1, wherein the light assembly comprises a 12-inch light bar and a 7-inch light bar.

8. The lighting tower system of claim 1, wherein the lighting tower system comprises a first switch communicatively coupled to the winch and, when actuated, causes the winch to retract or release the retractable cable thereby lowering or raising the tower to the retracted position or to the fully extended position, respectively.

\* \* \* \* \*